US008195445B2

(12) United States Patent
Brunet et al.

(10) Patent No.: US 8,195,445 B2
(45) Date of Patent: *Jun. 5, 2012

(54) DATA BACKUP SYSTEM INCLUDING A DATA PROTECTION COMPONENT

(75) Inventors: Jeffrey Brunet, Richmond Hill (CA); Ian Collins, Markham (CA); Yousuf Chowdhary, Maple (CA); Eric Li, Scarborough (CA); Alex Lemelev, Thornhill (CA)

(73) Assignee: Storage Appliance Corporation, Richmond Hill (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/016,996

(22) Filed: Jan. 29, 2011

(65) Prior Publication Data
US 2011/0125980 A1    May 26, 2011

Related U.S. Application Data

(60) Continuation of application No. 11/605,770, filed on Nov. 28, 2006, now Pat. No. 7,899,662, which is a continuation-in-part of application No. 11/506,386, filed on Aug. 18, 2006, now Pat. No. 7,818,160, which is a division of application No. 11/492,380, filed on Jul. 24, 2006, now Pat. No. 7,813,913.

(60) Provisional application No. 60/725,225, filed on Oct. 12, 2005, provisional application No. 60/814,687, filed on Jun. 19, 2006, provisional application No. 60/817,540, filed on Jun. 30, 2006, provisional application No. 60/739,828, filed on Nov. 28, 2005.

(51) Int. Cl.
*G06F 9/455* (2006.01)

(52) U.S. Cl. ............ 703/24; 703/23; 703/25; 710/1; 710/5; 710/62; 710/313; 707/650; 707/654; 711/115; 711/162; 717/138

(58) Field of Classification Search .................. 703/23, 703/24, 25; 710/1, 5, 62, 313; 707/650, 707/654; 711/115, 162; 717/138
See application file for complete search history.

(56) References Cited

U.S. PATENT DOCUMENTS 6,487,558 B1    11/2002    Hitchcock
(Continued)

FOREIGN PATENT DOCUMENTS

WO    2005086002 A1    9/2005

OTHER PUBLICATIONS

PCMag, "U3 Preview," Sep. 21, 2005.
(Continued)

*Primary Examiner* — Kamini S Shah
*Assistant Examiner* — Kibrom Gebresilassie
(74) *Attorney, Agent, or Firm* — Gard & Kaslow LLP

(57) ABSTRACT

A data backup system is provided for backing up data files from a data source and for securing those data files against accidental modification or deletion. The system comprises storage and a data protection component that includes an application programming interface defining a command set. The system can also comprise a backup application that is configured to use the commands of the command set. The data protection component allows applications that use the commands of the command set, such as the backup application, to access the storage of the system. The data protection component prevents operating systems and applications that do not use the commands of the command set from accessing the storage. The data protection function of the data protection component can optionally be disabled to allow open access to the storage.

35 Claims, 5 Drawing Sheets

U.S. PATENT DOCUMENTS

| | | |
|---|---|---|
| 6,496,979 B1 | 12/2002 | Chen et al. |
| 6,813,682 B2 | 11/2004 | Bress et al. |
| 6,986,030 B2 | 1/2006 | Shmueli et al. |
| 7,213,766 B2 | 5/2007 | Ryan et al. |
| 7,334,226 B2 | 2/2008 | Ramachandran et al. |
| 7,363,510 B2 | 4/2008 | Bobrow |
| 7,636,799 B2 * | 12/2009 | Yang et al. .................. 710/15 |
| 7,702,830 B2 * | 4/2010 | Brunet et al. ................. 710/62 |
| 7,739,429 B2 | 6/2010 | Shih |
| 7,813,913 B2 * | 10/2010 | Collins et al. ................. 703/24 |
| 7,818,160 B2 | 10/2010 | Collins et al. |
| 7,822,595 B2 * | 10/2010 | Brunet et al. ................. 703/23 |
| 7,844,445 B2 * | 11/2010 | Brunet et al. ................. 703/23 |
| 7,899,662 B2 * | 3/2011 | Brunet et al. ................. 703/24 |
| 8,050,905 B2 * | 11/2011 | Brunet et al. ................. 703/23 |
| 8,069,271 B2 * | 11/2011 | Brunet et al. ................. 710/5 |
| 2002/0063889 A1 | 5/2002 | Takemoto et al. |
| 2002/0083085 A1 | 6/2002 | Davis et al. |
| 2002/0143637 A1 | 10/2002 | Shmueli et al. |
| 2002/0147912 A1 | 10/2002 | Shmueli et al. |
| 2002/0184559 A1 | 12/2002 | Qin et al. |
| 2003/0105643 A1 | 6/2003 | Chen et al. |
| 2003/0225971 A1 * | 12/2003 | Oishi et al. .................. 711/115 |
| 2003/0233525 A1 | 12/2003 | Reeves |
| 2004/0193744 A1 * | 9/2004 | Paley et al. .................. 710/5 |
| 2004/0230708 A1 | 11/2004 | Juan |
| 2005/0086326 A1 | 4/2005 | Manning et al. |
| 2005/0193235 A1 | 9/2005 | Sandorfi et al. |
| 2005/0210080 A1 | 9/2005 | Saika |
| 2006/0010285 A1 | 1/2006 | Georgis |
| 2006/0200493 A1 * | 9/2006 | Shih .................. 707/104.1 |
| 2006/0289642 A1 | 12/2006 | Huang et al. |
| 2007/0076534 A1 * | 4/2007 | Shih .................. 369/25.01 |
| 2007/0083354 A1 | 4/2007 | Collins et al. |
| 2007/0083355 A1 * | 4/2007 | Collins et al. ................. 703/23 |
| 2007/0083356 A1 * | 4/2007 | Brunet et al. ................. 703/23 |
| 2007/0124130 A1 * | 5/2007 | Brunet et al. ................. 703/23 |
| 2007/0143096 A1 * | 6/2007 | Brunet et al. ................. 703/23 |
| 2007/0143097 A1 * | 6/2007 | Brunet et al. ................. 703/23 |
| 2007/0159940 A1 | 7/2007 | Ijtsma et al. |
| 2007/0162271 A1 * | 7/2007 | Brunet et al. ................. 703/25 |
| 2007/0225962 A1 * | 9/2007 | Brunet et al. ................. 703/23 |
| 2008/0147964 A1 * | 6/2008 | Chow et al. .................. 711/103 |
| 2008/0243466 A1 * | 10/2008 | Brunet et al. ................. 703/23 |
| 2009/0307380 A1 * | 12/2009 | Lee et al. .................. 710/14 |
| 2009/0307679 A1 * | 12/2009 | Lee et al. .................. 717/168 |
| 2010/0169560 A1 * | 7/2010 | Brunet et al. ................. 711/103 |
| 2011/0047128 A1 * | 2/2011 | Brunet et al. ................. 707/654 |
| 2011/0125980 A1 * | 5/2011 | Brunet et al. ................. 711/162 |

OTHER PUBLICATIONS

U3, "U3 Smart Drive Computing Platform," Jun. 2005.

* cited by examiner

DATA BACKUP SYSTEM INCLUDING A DATA PROTECTION COMPONENT

CROSS-REFERENCE TO RELATED APPLICATIONS

This application is a continuation of, and claims priority to, U.S. Non-Provisional patent application Ser. No. 11/605,770 filed on Nov. 28, 2006 now issued as U.S. Pat. No. 7,899,662, which is a continuation-in-part application of, and claims priority to, U.S. Non-Provisional patent application Ser. No. 11/506,386 filed on Aug. 18, 2006 now issued as U.S. Pat. No. 7,818,160 and entitled "Data Backup Devices and Methods for Backing up Data" which is a divisional application of U.S. Non-Provisional patent application Ser. No. 11/492,380 filed on Jul. 24, 2006 now issued as U.S. Pat. No. 7,813,913 and entitled "Emulation Component for Data Backup Applications" which claims the benefit of U.S. Provisional Patent Application No. 60/725,225 filed on Oct. 12, 2005 and entitled "A Method, Apparatus and a System for Removable Media Device Emulation on an External Storage Device via an Emulation Component for the Purpose of an Electronic Data Backup Appliance," U.S. Provisional Patent Application No. 60/814,687 filed Jun. 19, 2006 and entitled "Portable Electronic Data Backup Appliance Based on Integrated Circuit (IC) Memory," and U.S. Provisional Patent Application No. 60/817,540 filed on Jun. 30, 2006 and entitled "Portable Data Backup Appliance for Utilizing a Recordable Media Burner Device;" this application also claims priority to U.S. Provisional Patent Application No. 60/739,828 filed on Nov. 28, 2005 and entitled "Method, Apparatus and a System for Data Protection in an Electronic Data Backup Appliance." Each of the aforementioned applications is incorporated herein by reference in their entirety.

BACKGROUND OF THE INVENTION

1. Field of the Invention

The present invention relates generally to the field of digital data management and more particularly to systems for data backup applications.

2. Description of the Prior Art

Digital content, represented by digital data files of various file types, is rapidly replacing other forms of content. Documents, presentations, photos, movies, and music, for example, are increasingly produced and stored digitally. A problem for many individuals and organizations is that digital content, typically stored on a computer hard drive, can be poorly organized and needs to be archived to be protected against accidental loss. For example, digital photo files on a personal computer (PC) are likely to be found in numerous folders—photos transferred from a digital camera are stored in one set of folders, photos received as e-mail attachments are stored in other folders, and photos downloaded from websites are stored in still other folders.

One approach to archiving digital content is to periodically backup all of the data files on the computer, preserving the existing organizational structure. While this technique is effective to preserve digital content against accidental loss, the technique has several shortcomings. For one, the resulting copy is no better organized than the original, so misplaced or disorganized content remains misplaced or disorganized. Also, backing up all data files requires substantial memory capacity to copy numerous files that are otherwise already preserved elsewhere. Application specific files, for example, originally loaded onto the computer from a compact disc (CD) are already archived on the CD and therefore do not need to be backed up.

The necessary storage capacity for a complete backup can be obtained with writable data storage media, such as hard disc drives (HDDs), however, these require device installation and software set-up when first connected to a system. In order to complete these steps, a user may have to provide information about the existing system, which the user may not readily know. Also, the user may have to make decisions regarding the configuration of the device and the backup software. The number of steps involved with installation and set-up, as well as the complexity of some of the steps, dissuades many users from bothering with backup applications. The expense of a writable data storage media with enough capacity to perform a complete backup can a so dissuade users from performing complete backups. Furthermore, some users, having bought and installed the necessary storage capacity, are dissuaded from performing frequent backups due to the length of time the system is tied up while performing a complete backup.

Alternately, a user can manually select a set of files from a directory and copy the selected files to a storage device. While this alternative may allow usage of a smaller memory device that does not require installation and set-up steps, manually selecting files is time-consuming. Also, manually selecting files creates the possibility of an accidental omission of some files.

Digital content can also be uploaded to an on-line storage service. On-line storage services provide several advantages including substantial storage capacities and the ability to access data files from remote locations. On-line storage services, for data backup purposes, not only fail to provide any automated backup applications, but also require significant user involvement to select an appropriate on-line storage system from the various alternatives, set up an account with the chosen system, configure the account with user identification, password, and payment information, select between various service options offered by the system, and so forth. Additionally, this approach suffers from many of the same drawbacks described above. A complete backup would still be no better organized than the original system, and depending on the data transmission rate for uploading files, may take an unreasonable length of time. A manually selected set of files would be just as time-consuming to determine, and just as likely to include accidental omissions.

A further drawback of existing data backup solutions is the relative ease with which a user can accidentally modify or delete backed-up data files. For example, once data files have been backed-up to a secondary storage device, the typical operating system, such as the Windows operating system, will allow a user to access the data files on the secondary storage device. Thus, the user can readily rename, modify, overwrite, or delete these data files either intentionally or inadvertently.

What is needed, therefore, is the ability to selectively backup digital content in a manner that is inexpensive, convenient, and that restricts the user's ability to corrupt the backed-up content.

SUMMARY

An exemplary data backup system comprises a communication interface, a first storage device, and an emulation component. The first storage device includes a writable data storage medium comprising first and second logical storage areas, and in some embodiments the first logical storage area stores a data backup application. The emulation component is in communication between the first storage device and the communication interface. The emulation component comprises logic configured to represent the first logical storage area as an auto-launch device, and additional logic configured to represent the second logical storage area as a second storage device including a writable data storage medium. It will be appreciated that the logic of the emulation component can be implemented through software, hardware, firmware, or a combination thereof.

The emulation component of the exemplary data backup system can also comprise, in some embodiments, logic configured to receive auto-launch device commands from the communication interface, translate the auto-launch device commands to first storage device commands, and send the first storage device commands to the first logical storage area, and additional logic configured to receive first storage device responses from the first logical storage area, translate the first storage device responses into auto-launch device responses, and send the auto-launch device responses to the communication interface. The emulation component can further comprise logic configured to receive second storage device commands from the communication interface and send the second storage device commands to the second logical storage area, and additional logic configured to receive second storage device responses from the second logical storage area, and send the second storage device responses to the communication interface.

In some embodiments the first storage device comprises a HDD, and in some of these embodiments the first and second logical storage areas comprise first and second partitions of the HDD. In other embodiments the first storage device comprises solid-state memory or an optical device. Suitable solid state memories include any solid state memory that can be written at least once, including a Secure Digital (SD) memory card, a Compact Flash (CF) memory card, or a memory stick. Suitable optical devices include CD and Digital Video Disc (DVD) drives. Exemplary writable data storage media for these drives include Compact Disc-Recordable (CD-R) and Compact Disc ReWritable (CD-RW) media, and Digital Video Disc-Recordable (DVD-R and DVD-E-R) and Digital Video Disc ReWritable (DVD-RW and DVD+RW) media, respectively.

An exemplary method for backing up data stored on a data source comprises returning a response to an inquiry from the data source. The response identifies a first storage device of a first device type as instead being of a second device type. Here, the second device type belongs to a class of device types that, upon connection to the data source, will trigger an operating system of the data source to automatically execute a backup application stored on the first storage device. The exemplary method further comprises providing the backup application to the data source to selectively copy data stored on the data source. Providing the backup application includes receiving auto-launch device commands from the data source, translating the auto-launch device commands into first storage device commands, and sending the first storage device commands to the storage device. Providing the backup application also includes receiving first storage device responses from the first storage device, translating the first storage device responses into auto-launch device responses, and sending the auto-launch device responses to the data source.

In some embodiments, the method for backing up data stored on the data source also comprises selectively copying data files to a second storage device, and in some embodiments the first storage device comprises the second storage device. In other embodiments, selectively copying data files includes sending copied files to a web-based storage facility. Selectively copying data files can include searching one or more storage devices associated with the data source for data files that meet a predefined criterion, for example, that the data files have not previously been copied to a data backup system, or that the data files have a file type associated with a type of content. Selectively copying data files can also include creating a directory structure on the second storage device to indicate the location of a copied file on the data source. Selectively copying data files can further include determining whether a data source has been previously paired with a data backup system. Selectively copying data files can be initiated, in some embodiments, by a user command or by connecting a removable storage device to a communication port of a data backup system.

Another exemplary data backup system comprises a communication interface, a first storage device including a first logical storage area including a backup application, an emulation component, and a data protection component. The emulation component is in communication between the first logical storage area and the communication interface and comprises logic configured to represent the first logical storage area as an auto-launch device. The data protection component is in communication between the emulation component and the communication interface and includes an application programming interface defining a command set, the backup application being configured to use a command of the command set some embodiments, the first storage device further includes a second logical storage area and the emulation component further comprises logic configured to represent the second logical storage area as a second storage device including a writable data storage medium. In some of these embodiments, the backup application is configured to execute on a data source and to use the command of the command set to write data files from the data source to the second logical storage area.

In additional embodiments the data protection component of the data backup system is switchable between a protection state wherein the data protection component uses the application programming interface to selectively limit communications with the first storage device, and an open state wherein the data protection component does not limit communications with the first storage device. Here, the data backup system can further comprise a mechanical switch to switch the data protection component between the protection state and the open state. In other instances, the data protection component is configured to receive a command to switch the data protection component between the protection state and the open state. The backup application can include an exit routine configured to send a command to the data protection component to revert to the protection state. The data protection component can also be configured to power-up in the protection state. Additionally, the data protection component can be configured to revert to the protection state from the open state after being in the open state for a set period of time.

In some further embodiments, the data protection component is switchable between a first protection state wherein the data protection component uses the application programming interface to selectively limit communications with the first logical storage area, and a first open state wherein the data protection component does not limit communications with the first logical storage area. In some of these embodiments the first storage device further includes a second logical storage area. In these embodiments the data protection component is further switchable between a second protection state wherein the data protection component uses the application programming interface to selectively limit communications with the second logical storage area, and a second open state wherein the data protection component does not limit communications with the second logical storage area.

Another exemplary method for backing up data stored on a data source comprises providing a backup application from a first logical storage area of a storage device to the data source. The method further comprises receiving, from a communication interface of a backup system, a first request from the data source to write a data file to a second logical storage area, the first request including a write command, and passing the first request to a memory device interface for the second logical storage area if the write command complies with an application programming interface. In some embodiments the second logical storage area is also of the storage device. I some of these embodiments the method further comprises receiving, from the communication interface of the backup system, a second request from the data source to access the second logical storage area, the second request including a command that does not comply with the application programming interface, and not passing the second request to the memory device interface for the second logical storage area.

A method for controlling access to a storage device is also provided. The method comprises receiving, from a communication interface of a backup system, a firs request from a data source to access the storage device, the first request including a command that complies with an application programming interface, and passing the first request to a memory device interface for the storage device. The method further comprises receiving, from the communication interface of the backup system, a second request from the data source to access the storage device, the second request not including a command that complies with the application programming interface, and not passing the second request to the memory device interface for the storage device. In some embodiments, the command that complies with the application programming interface comprises a write command, a read command, or a command to switch a state of a data protection component. In some instances, not passing the second request to the storage device includes sending an error message to the data source. The second request from the data source can be from an operating system of the data source or an application running on the data source, for example.

DETAILED DESCRIPTION OF THE INVENTION

A data backup system is provided for personal, as well as commercial, applications. The data backup system of the present invention allows files to be selectively copied from a data source, such as a personal computer, to a storage device according to some criteria such as file type. For example, the system can be configured to backup audio files having recognized music file extensions such as .mp3 and .wav, or image files having recognized image file extensions such as .jpg, .pct, and .tif. The data backup system, according to some embodiments, stores a backup application that automatically launches when the data backup system is connected to the data source. The backup application can be configured to require little or no user input to perform the backup process.

The data backup system can take a number of different forms. One example is an appliance that includes both the backup application and sufficient storage capacity for copied files. Another example is a device that includes the backup application and an interface for connecting sufficient storage capacity in the form of a storage device such as an external HDD or flash memory device. In both examples, the system includes an emulation component. The emulation component makes the portion of the data backup system that contains the backup application appear to the data source as if it were of a particular device type. More specifically, the backup application portion of the data backup system is represented as being one of a class of storage devices referred to herein as "auto-launch devices." Emulating an auto-launch device allows the data backup system to take advantage of automatic execution capabilities of certain operating systems so that the backup application will automatically be executed when the device is connected to a data source running the operating system.

Figure 1:
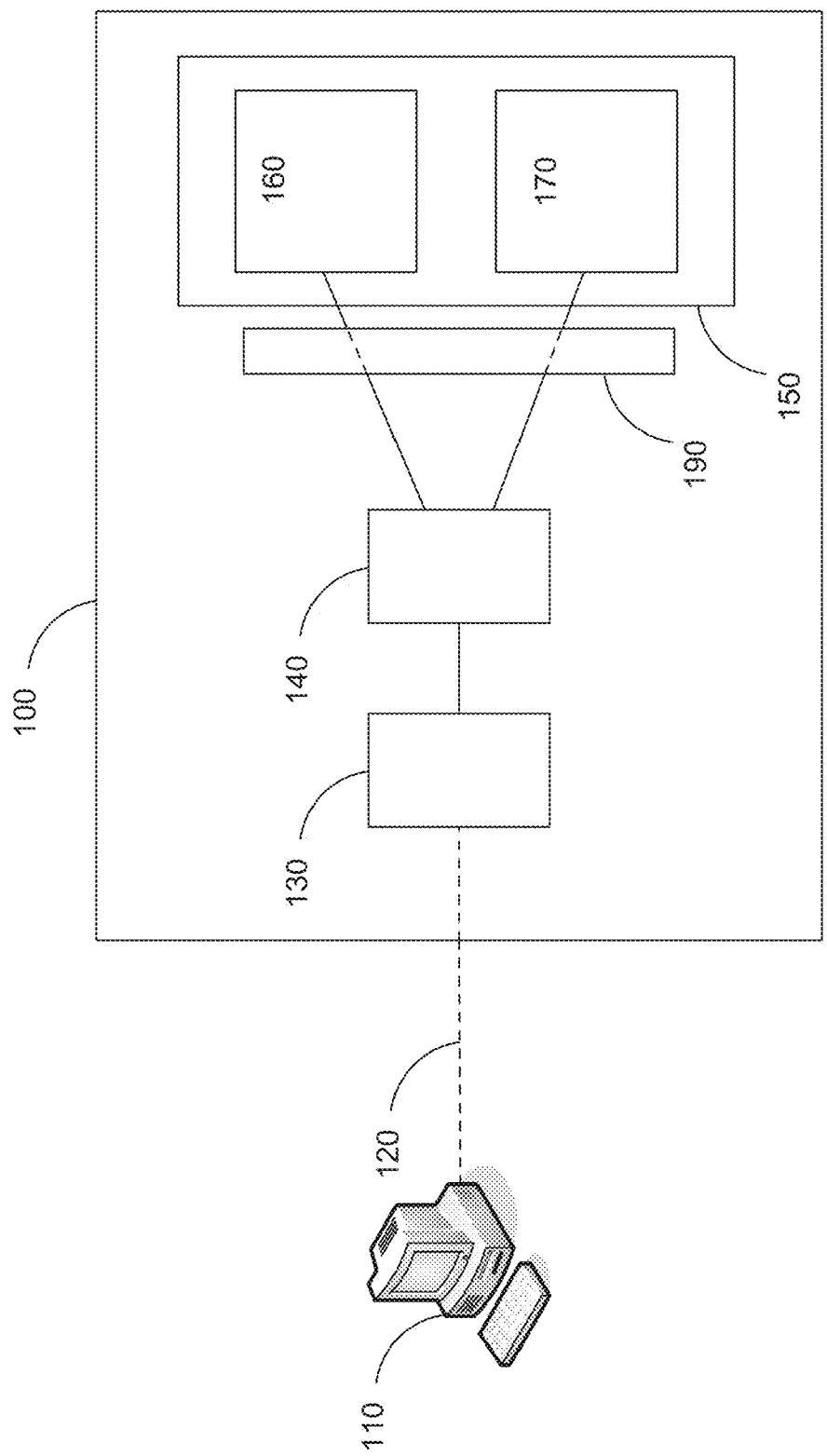
FIG. 1 is a schematic representation of a data backup system according to an exemplary embodiment of the present invention.

FIG. 1 provides a schematic re preservation of an exemplary embodiment of a data backup system 100 connected to a data source 110 by a connection 120. The data source 110 can be, for example, a personal computer (PC), a Macintosh computer (Mac), or a Personal Digital Assistant (PDA) on which data resides. The data source 110 can also comprise a server, a settop box, a television, a cellular telephone, a Smartphone, a digital still camera or video camera, a scanner, a digital music or video player, a game console, or a Personal Video Recorder (PVR). Preferably, the data source 100 includes an operating system (OS), such as Windows XP, that includes an automatic application launching function, as discussed in more detail elsewhere herein. Other suitable operating systems include MacOS, PalmOS, Linux, and Unix, for example. The connection 120 between the backup system 100 and the data source 110 can be essentially any data transfer mechanism such as an optical or electrical cable, a wireless link, or a network connection. The connection 120 is shown with a dashed line in FIG. 1 to indicate that the connection 120 need only be temporary.

As shown in FIG. 1, the backup system 100 comprises a communication interface 130, an emulation component 140, and a storage device 150 that includes a first logical storage area 160 and second logical storage area 170. The communication interface 130 allows the data source 110 to communicate with the emulation component 140 of the backup system 100 according to a communication protocol. The communication interface 130 can be for example, USB. FireWire, or a wireless interface such as infrared, Bluetooth, or WiFi.

It will be appreciated that the backup system 100 can include a plurality of communication interfaces 130, of the same or of different types, to accommodate multiple and/or different data sources 110. Depending on the type of communication interface 130, the communication interface 130 can include a communication port through which the connection 120 to the data source 110 is made. For instance, a USB communication interface 130 can include a USB communication port, and a FireWire communication interface 130 can include a FireWire communication port. Alternatively, the communication interface 130 can include a wireless antennae or an infrared transmitter/receiver unit for sending and receiving infrared signals.

The storage device 150 comprises a writable data storage medium and can be, for example, a HDD that has been partitioned into at least two logical storage areas. In this instance, each logical storage area is a partition of the HDD. Suitable HDDs for the storage device 150 include 1.0 inch, 1.8 inch, 2.5 inch, and 3.5 inch hard drives having capacities of 20 to 60 gigabytes (GB) or more. Other suitable storage devices 150 that include rewritable, media are solid-state memory devices, such as SD memory cards and CF memory cards. The storage device 150 can also be an optical device such as a CD drive or a DVD drive where the writable data storage medium within such an optical storage device 150 can be either a write-once medium, such as a Compact Disc-Recordable (CD-R), DVD-Recordable (DVD-R or DVD+R), or a rewritable medium such as a Compact Disc-Rewritable (CD-RW), or DVD-Rewritable (DVD-RW or DVD+RW).

The storage device 150 can also be implemented by two different devices, one dedicated to each of the two logical storage areas 160, 170. For example, the first logical storage area 160 can be implemented by a CD drive with any CD media, white the second logical storage area 170 is implemented by a HDD. In a further example, the first logical storage area 160 can be implemented by a solid state memory while the second logical storage area 170 is implemented by an optical device with a writable data storage medium. In this further example, the two different devices could be contained within a common housing. It will be understood that the device types, form factors, and capacities provided herein are merely exemplary and not intended to be limiting.

In some embodiments, the backup system 100 further comprises a memory device interface 190 that allows the first and second logical storage areas 160 and 170 to communicate with the emulation component 140. In these embodiments the memory device interface 190 is of a type that is appropriate to the type of storage device 150. For instance, an Integrated Drive Electronics (IDE) interface 190 can be used with an IDE HDD storage device 150, and a Small Computer System Interface (SCSI) interface 190 can be used with a SCSI HDD storage device 150. Alternately, the memory device interface 190 can be a SD memory card host interface where the storage device 150 is a SD memory card. The interface 190 can also be a wireless interface such as infrared, and Bluetooth. The memory device interface 190 can be implemented in the backup system 100 by an integrated circuit (IC) chip or through the use of discrete components. The memory device interface 190 is integrated into the memory device 150, in some embodiments. It will be appreciated that in the embodiments noted above that employ multiple storage devices 150, the backup system 100 can include multiple memory device interfaces 190 as appropriate.

The first logical storage area 160 represents a logical area of the memory device 150 that is meant to be inaccessible to the user and safe from accidental erasure. The first logical storage area 160 can contain, for example, a backup application, system files, drivers, and other setup and configuration software. The first logical storage area 160 is represented to the data source 110 by the emulation component 140 as being an auto-launch device. As used herein, auto-launch devices are those devices that will trigger the automatic execution functionalities of certain operating systems, such as the Auto-Run function of the Microsoft Windows operating system. Examples of device types that will trigger AutoRun of Windows include CD and DVD drives when a CD or DVD medium is contained therein. In these examples, the Windows AutoRun functionality is triggered either when the CD/DVD is placed in the CD/DVD drive already connected to the data source 110, or when the CD/DVD drive, already containing the CD/DVD medium, is connected to the data source 110.

The second logical storage area 170 represents a logical area of the memory device 150 that is dedicated to storing backed-up data Accordingly, the emulation component 140 represents the second logical storage area 170 to the data source as being a device type that includes a writable data storage medium. The second logical storage area 170 can be represented as a HDD, CF, or a SD memory card, for example. In some embodiments, the second logical storage area 170 can be represented as the same type of device as the storage device 150. In other embodiments the second logical storage area 170 can be represented to be a different device type than the storage device 150.

The emulation component 140 provides certain functions to the backup system 100 and can be implemented through logic such as software, firmware, hardware, or any combination of these. It will be understood that within an embodiment different functions of the emulation component can be implemented with different forms of logic. Thus, while one function of the emulation component 140 is implemented through firmware, for example, another function can be implemented through software.

In one embodiment, the emulation component 140 includes an IC. For example, the emulation component 140 can be implemented using software, firmware, hardware, or some combination thereof, incorporated in a USB controller chipset. In some USB-specific embodiments, the emulation component 140 implements some or all of a number of layered industry standards. Examples of such standards include USB Specification—Revision 2.0, USE Mass Storage Class—Bulk Only Transport—Revision 1.0, SCSI Primary Commands-3 (SPC-3), SCSI Block Commands-2 (SBC-2), Multimedia Commands-4 (MMC-4), and AT Attachment with Packet Interface-6 (ATA/ATAPI-6). It should be noted that in some embodiments the emulation component 140 may only support subsets of the commands of these industry standards.

Functions provided by the emulation component 140 can include representing the first logical storage area 160 as an auto-launch device and representing the second logical storage area 170 as a device including a writable data storage medium. Accordingly, the data source 110 will recognize the data backup system 100 as two attached devices when connected to the backup system 100. It should be noted, however, that in some embodiments the contents of these two devices are not accessible to the user of the data source but are accessible by the backup application which is configured with appropriate application programming interface (API) calls. This serves to protect the contents of both the first and second logical storage areas from accidental modification or erasure. To access the backed up data from the second logical storage area 170 in some embodiments, the data backup system 100 restores the data to the data source or copies the data to yet another device. In other embodiments, the virtual device that represents the second logical storage area 170 is accessible to the user while the virtual device that represents the first logical storage area 160 is not accessible. In these embodiments, the user is allowed direct access to the contents of the second logical storage area 170 but not the first logical storage area 160.

Another function that can be provided by the emulation component 140 is translating commands and responses between formats, such as between the command sets for a HDD and a CD drive. In this way, when the data source 110 sends a command to the backup system 100 addressed to the auto-launch device (as the first logical storage area 160 is represented to be), the emulation component 140 translates the command from an auto-launch device format to the appropriate format for the storage device 150, before sending the command to the first logical storage area 160. Similarly, responses from the first logical storage area 160, in the format of the storage device 150, are translated into the auto-launch device format and sent to the data source 110 so the response appears to have come from an auto-launch device.

It should be noted that translation between CD drive and HDD formats is but one example, and in some embodiments the emulation component 140 can implement one or more analogous format translations. As used herein, a "storage device command" refers to a command in an appropriate format for the specific storage device, and a "storage device response" refers to a response in the same format. As a specific example, an "auto-launch device command" refers to a command in an appropriate format for a specific auto-launch device, and an "auto-launch device response" refers to a response in the same format.

Still another function that can be provided by the emulation component 140 is to pass commands and responses between the data source 110 and the second logical storage area 170. When the commands received by the emulation component 140 are already in the proper format for the storage device 150, the emulation component 140 does not have to translate commands or responses. Here, the emulation component 140 receives commands from the data source 110 addressed to the device that includes the writable data storage medium and passes the commands to the second logical storage area 170. In a similar fashion, responses are relayed back to the data source 110 without translation. It will be appreciated that the emulation component 140 can be configured to represent the second logical storage area 170 as being of a different type of device than the memory device 150. In these embodiments, the emulation component 140 is configured to translate between the formats of the memory device 150 and the device type of the representation of the second logical storage area 170.

Figure 2:
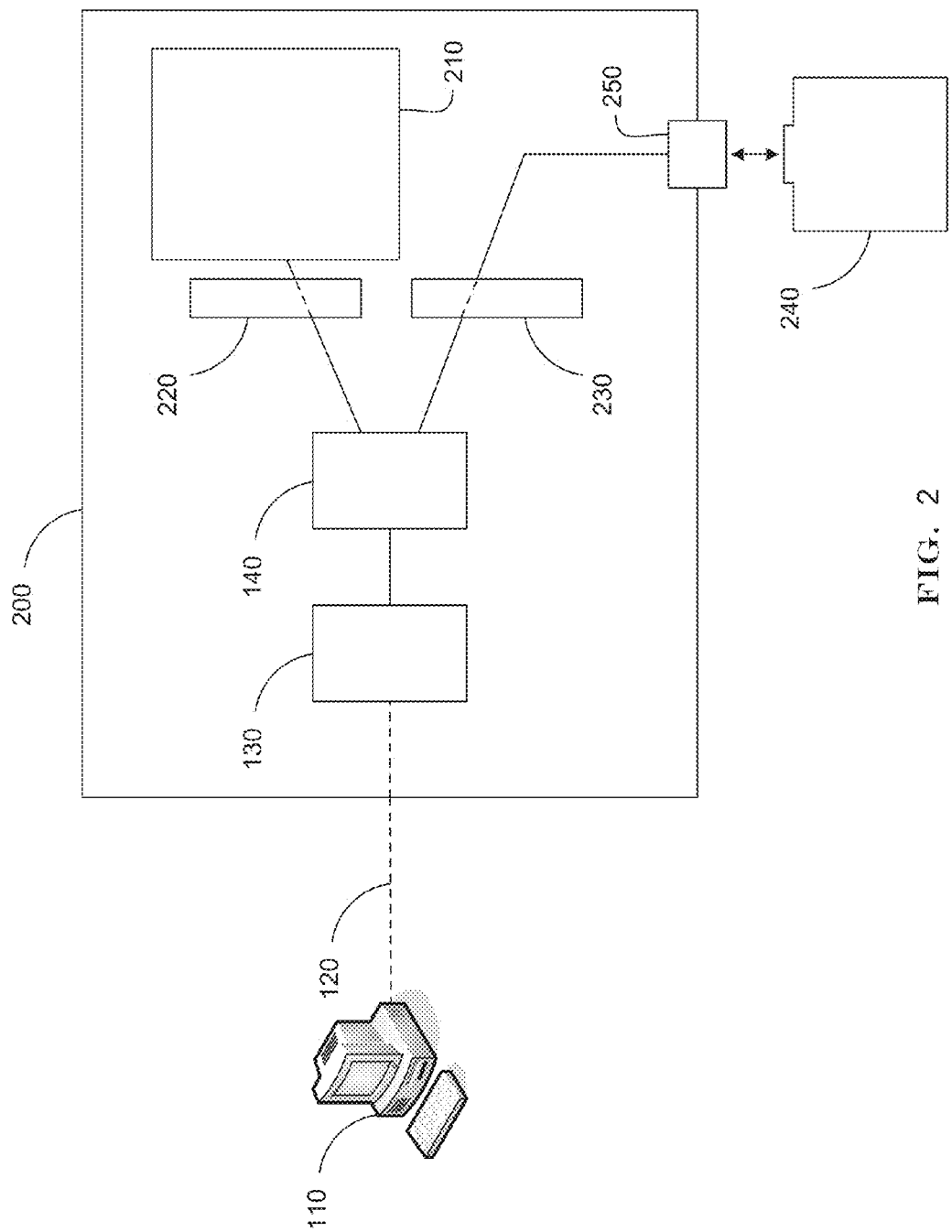
FIG. 2 is a schematic representation of a data backup system according to another exemplary embodiment of the present invention.

FIG. 2 provides a schematic representation of another exemplary embodiment of a data backup system 200 that, like the data backup system 100, is connected to the data source 110 by the connection 120. Also like the data backup system 100, the backup system 200 comprises the communication interface 130, and the emulation component 140. In this embodiment, the backup system 200 also comprises storage device 210 including a writable data storage medium and an appropriate memory device interface 220. Since the writable data storage medium of the storage device 210 only needs to include enough memory capacity to store a backup application and the like, the backup system 200 can be of a fairly small form factor, such as pocket-sized or a dangle, or be embedded in some other device configuration such as a dock or a cradle.

The data backup system 200 can also comprise a removable storage device interface 230 to allow a removable storage device 240, including a writable data storage medium, to be attached externally to the data backup system 200 by way of a communication port 250. The removable storage device interface 230 provides communication between the emulation component 140 and the removable storage device 240. In some embodiments the removable storage device interface 230 is configured to support a removable device with an integrated medium such as a flash memory device or HDD. In other embodiments, the removable device can be one that accepts removable media, such as a CD drive.

It will be appreciated that the removable storage device interface 230 is optional as the copied files do not necessarily have to be stored to a memory device that is associated with the data backup system 200. Alternately, the backup application can direct copied files to be stored to an existing internal or external drive of the data source or to a networked drive. In still another option, the backup application can send copied files over an Internet connection to be stored at a web-based storage facility.

It should be noted that the backup systems 100, 200 can include a display or other visual indicator such as a light emitting diode (LED) to show files being copied, for instance, though some embodiments do not include the display to lower the cost and increase the durability of the backup systems 100, 200. The backup systems 100, 200 can run off of a battery, an external power source (e.g., an AC power outlet), or off of power supplied by the data source 110. In some embodiments, the connection 120 is a cable that is part of the backup system 100, 200. The backup systems 100, 200 can also be configured as a cradle designed to receive the removable storage device 240 or the data source 110 where the data source 110 is a consumer electronic device such as a digital camera.

Figure 3:
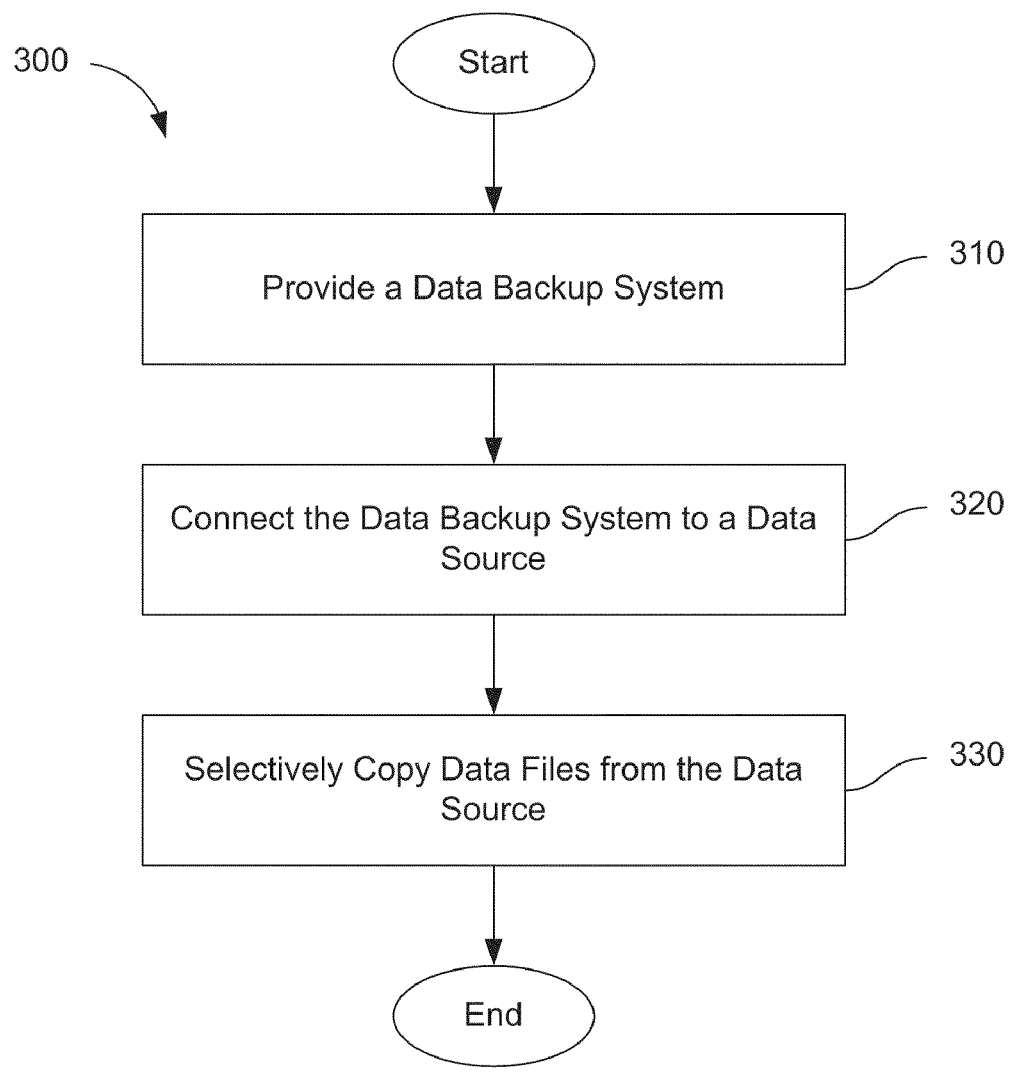
FIG. 3 is a flow-chart representation of a method for backing up data files on a data source according to an exemplary embodiment of the present invention.

FIG. 3 is a flow-chart representation of an exemplary method 300 for backing up data files from a data source. The method 300 comprises providing 310 a data backup system including a storage device storing a backup application, connecting 320 the data backup system to the data source to automatically launch the backup application, and selectively copying 330 the data files from the data source.

Providing 310 the data backup system can include providing data backup system 100 or data backup system 200, for example. In those embodiments in which the data backup system 200 is used, providing 310 the data backup system 200 can include, for example, connecting a removable storage device 240 to the communication port 250. Where the removable storage device 240 is, for example, a SD or CF memory card, connecting the removable storage device 240 to the communication port 250 can include inserting the memory card into the communication port 250. Alternatively, where the removable storage device 240 is a HDD, connecting the removable storage device 240 to the communication port 250 can include coupling the communication port 250 to the removable storage device 240 with a connection such as a cable or a wireless link.

With reference to data backup systems 100, 200, connecting 320 the data backup system 100, 200 to the data source 110 can include coupling the communication interface 130 to the data source 110 with the connection 120. Connecting 320 the data backup system to the data source also includes the data source recognizing the data backup system as two new devices. For example, some operating systems periodically query unused ports for newly attached hardware. An exemplary process by which the data backup system 100, 200 can be recognized by the data source 110 as being two attached devices is described below with respect to FIG. 4.

Connecting 320 the data backup system to the data source automatically launches a backup application. Operating systems that include an automatic execution function, such as the AutoRun capability of the Windows operating system, can execute applications that are resident on an auto-launch device. Here, the automatic execution function of the data source's operating system recognizes the backup application as an application to be launched, and automatically launches the backup application to run on the data source.

Connecting 320 the data backup system to the data source can also comprise translating commands and responses between device formats as communications are passed between the data source and the data backup system, as discussed above with respect to the functionality of the emulation component 140. Thus, for example, CD read commands sent to the backup system 100 are translated to HDD read commands before being sent to the first logical storage area 160.

Selectively copying 330 the data files from the data source can include running the backup application on the data source, where the backup application is configured to search one or more storage devices associated with the data source. The backup application can, in some embodiments, search directories of internal storage devices, external storage devices, and network drives that are accessible to the data source. The backup application selectively copies files to a storage device including a writable data storage medium such as the second logical storage area 170 or the removable storage device 240.

The backup application selects files that meet at least one criterion, such as file type (e.g., .jpg) or type of content (e.g., audio files). The backup application can also find files that meet at least one of several criteria. Other examples of types of content include e-mails, business application data (e.g., Accpac and Simply Accounting files), digital video files, ebook files, contacts files, calendar files, text files, tasks files, settings files, bookmark files, and password files. Another criterion, in some embodiments, is whether a file has been previously backed up. Yet another criterion can be a particular date or a range of dates. The backup application, in some embodiments, finds files that meet the criteria by searching e-mail attachments and files embedded within other files, such as compressed files within a .zip file. The backup application can find files that are stored directly on the data source, or additionally on associated peripheral devices and networks.

The backup application can, in some embodiments, create a file path or directory structure on the writable data storage medium of the data backup system to indicate the location where a copied file was located on the data source. In other embodiments, the backup application creates a new directory structure based on chronological order, alphabetical order, file size, or some other criteria. Another alternative is for the backup application to create a monolithic file that includes all of the backed up files. Yet another alternative is for the backup application to store on the writable data storage medium the backed up files in a common directory (i.e., a flat structure) and to create an index (e.g. an XML index) that stores the information on file locations. In these embodiments, when the backed up files are restored the index is used to re-create the directory structure on the data source.

It will be appreciated that according to the method 300, user involvement can be reduced to simply making a physical connection between a data backup system and a data source. While user involvement can be reduced to one or more simple operations, it will be appreciated that options can be provided to the user through a graphical user interface (GUI) provided by the backup application on a display device of the data source. In this way the user, if desired, can customize the backup process by specifying search criteria such as a type of content or a file type to be copied. Additionally, the user can limit the scope of the backup process by drive, directory, folder, file type, file size, or date/time stamp, or the user can deselect a type of content or a specific file, drive, directory, or folder such as a temporary folder or an Internet Explorer directory.

As noted, selectively copying 330 the data files from the data source can include running the backup application on the data source. In addition to the above functions of the backup application, the backup application can also be configured to perform the following functions as part of selectively copying 330 the data files. For example, the backup application can wait a predetermined length of time and then repeat the backup process no long as the backup system remains connected to the data source 110. The backup application can also perform a self-diagnostic routine at predetermined intervals. The backup application can also be configured to wait for a predetermined period of time before performing an automatic backup to provide the user an opportunity to customize the backup process. Additionally, the backup application can be configured to selectively copy 330 the data files only upon a user command, rather than automatically. The user command can be entered through the GUI on the data source, or can be provided by a button or switch on the data backup system. Alternately, the backup application can be configured to selectively copy 330 the data files whenever a removable storage device 240 is connected to the communication port 250.

Copying 330 the data files, in some embodiments, includes determining whether the data source has been previously paired with the data backup system (e.g., the data source was previously backed up with the data backup system). This can include, for example, searching for a marker that was previously left on the data source, or comparing a marker saved on the data backup system with an identifier of the data source such as a volume label. The marker allows the backup application) recognize the data source. In some embodiments, the backup application determines a course of action based on whether the data source has been previously paired with the data backup system and if so, whether the data backup system already stores data associated with the data source. For instance, the course of action can be an automatic backup of the data source, either full or incremental, a restoration of backed up data to the data source, or a query to the user to make a selection between these or other alternatives.

Figure 4:
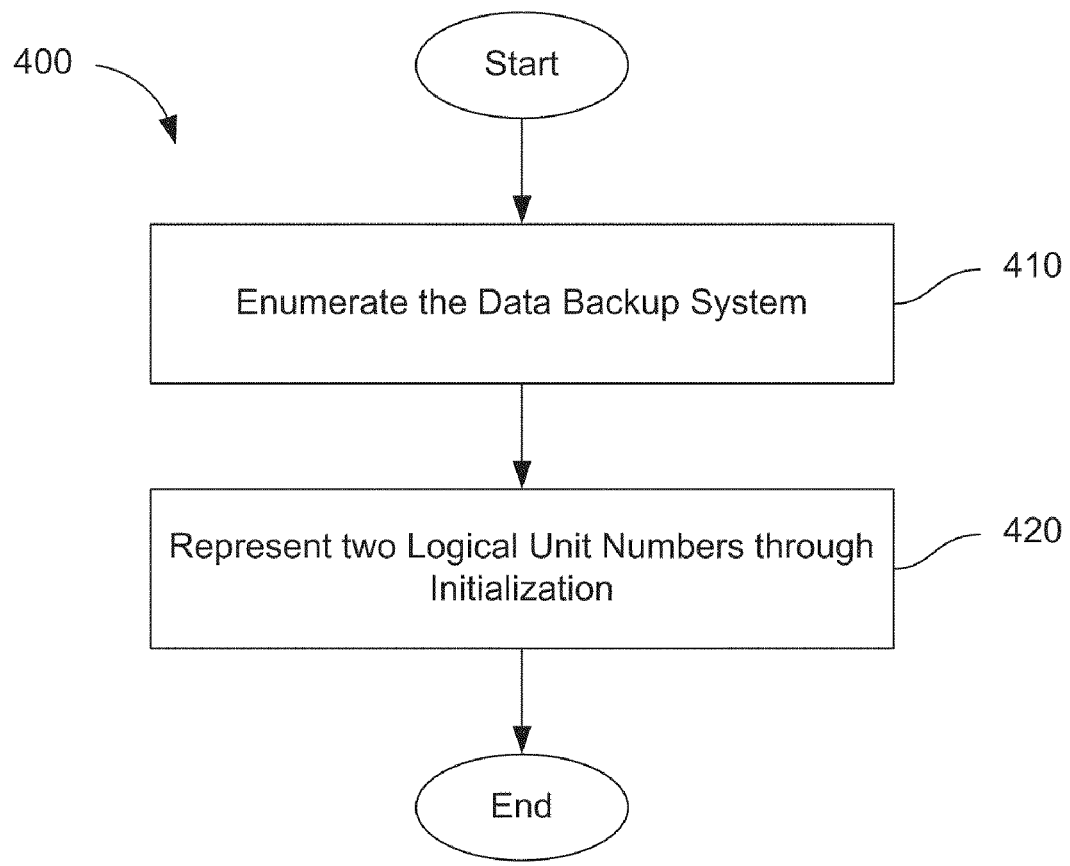
FIG. 4 is a flow-chart representation of a process by which a data backup system can be recognized by the data source as being two attached devices according to an exemplary embodiment of the present invention.

FIG. 4 is a flow-chart representation of an exemplary method 400 by which the data backup system, once detected, becomes recognized as two attached devices by the data source. Although this exemplary method 400 is described with reference to USB protocols, it will be understood that other protocols such as FireWire follow analogous processes. The method 400 comprises the data source enumerating 410 the data backup system, followed by the emulation component of the data backup system representing 420 two Logical Unit Numbers (LUNs) through initialization.

Enumerating 410 the data backup system is performed to identify the newly attached hardware, in this case the data backup system, and how the hardware is configured for communication. Enumerating 410 comprises the data source assigning a unique device number and querying the data backup system for a device descriptor. The emulation component responds by providing a device descriptor to the data source. Enumerating 410 further comprises the data source setting an address for the data backup system. Once the address has been set, the data backup system obtains communication frames assigned to the address. Enumerating 410 can also comprise the data source requesting and receiving detailed device information from the data backup system, specifically the emulation component, such as class, subclass, and protocol.

Enumerating 410 also comprises the data source starting an appropriate USB mass storage class driver, and the USB mass storage class driver requesting the number of LUNs from the data backup system with a "GET MAX LOGICAL UNIT NUMBER" command. Enumerating 410 also comprises the data backup system, and more specifically the emulation component, responding to the "GET MAX LOGICAL UNIT NUMBER" command by communicating two LUNs to the data source.

Representing 420 the two LUNs through initialization comprises the emulation component receiving a number of SCSI commands directed to each LUN from the data source. The emulation component handles each LUN independently. The emulation component responds to those SCSI commands that it recognizes, and generates a standard error condition in response to SCSI commands that are not recognized. Each SCSI command, and any errors that are generated, are typically handled before the next SCSI command is issued to either LUN. It will be understood that the sequence of SCSI commands sent to the LUN representing a storage device including a writable data storage medium can be different from those sent to the LUN representing an auto-launch device. Additionally, SCSI commands, or a sequence of SCSI commands, may be repeated multiple times by the data source, and sequences of SCSI commands directed to the two LUNs can be interlaced.

For both LUNs, the sequence of SCSI commands starts with the USB mass storage class driver issuing an "INQUIRY" command to identify the device type. The emulation component returns a response to represent a storage device, such as second logical storage area 170 (FIG. 1), as a storage device that can include a writable data storage medium. A response of "0x00," for example, indicates that the storage device is a HDD. Similarly, the emulation component returns a response to represent a storage device, such as first logical storage area 160 (FIG. 1) as an auto-launch device. A response of "0x05," for instance, indicates that the auto-launch device is a CD drive. The storage device that can include a writable data storage medium can additionally be marked as either "removable" or "non-removable," while the auto-launch device can be marked as "removable." After this point, the sequence of SCSI commands for the two LUNs diverge. It will be appreciated that the order of SCSI commands in the sequences described below are exemplary, and the order of the SCSI commands will vary with different data sources. Also, in some instances one or more of the SCSI commands provided below are omitted, and/or other SCSI commands are included.

An exemplary sequence of SCSI commands directed to the storage device that includes the writable data storage medium continues with a "READ FORMAT CAPACITIES" request that the data source uses to determine whether the writable data storage medium is unformatted. Ordinarily, the medium of the storage device being represented is already formatted, and the emulation component responds accordingly. Otherwise, the data source will attempt to format the medium of the storage device. Next, the data source issues a "READ CAPACITY" request to identify the capacity of the writable data storage medium and its block size, and the emulation component returns this information as well. A "READ(10)" command is issued to read the first block on the writable data storage medium. The first block has a logical bock addressing (LBA) value of zero (LBA=0) and contains the Master Boot Record (MBR), which itself contains the partition table for the writable data storage medium. The emulation component responds with the contents of the requested block.

A "MODE SENSE(6)" command is then used to extract the capabilities of the storage device including the writable data storage medium, such as whether the storage device contains a disk cache. The emulation component replies as appropriate to the capabilities of the storage device being represented. Another "READ(10)" command is issued to recover the first block of the file system that contains the root directory. The first block of the file system can be located at LBA=0x3F, for example, but can vary depending on the particular type of file system being represented. The emulation component returns the first block of the file system. Finally, the data source can issue a "TEST UNIT READY" request before reading the full contents of the root directory, etc. Here, the emulation component responds affirmatively so that the data source will regard the storage device that includes the writable data storage medium as operational. The data source thereafter issues more read/write requests as necessary.

An exemplary sequence of SCSI commands directed to the auto-launch device continues with a "GET CONFIGURATION" request to obtain information about the capabilities of the auto-launch device and its ability to read or write different types of optical media, e.g., CD-R, CD-RW, DVD-R, DVD-RW, DVD+RW, etc. The emulation component responds with capabilities that are appropriate for the auto-launch device being represented to the data source. This can be followed by a "READ CAPACITY" request to discover if there is a medium present in the auto-launch device. The emulation component is configured to respond by failing the initial attempt. In response, the data source will issue a "REQUEST SENSE" command to access the extended error information. In the reply, the emulation component sets the "Sense Key" to "UNIT ATTENTION," and sets the "Additional Sense Code" to "POWER ON." The data source will then repeat the "READ CAPACITY" request, and the emulation component will respond with a capacity, such as the size of the first logical storage area 160 (FIG. 1).

To learn what types of status change events the read-only media device supports, the data source issues an initial "GET EVENT STATUS NOTIFICATION" request, and the emulation component responds with a set of coded status fields. The data source can then repeat the "GET EVENT STATUS NOTIFICATION" request, with a field set to a status entry to be checked. If the operational status field is enabled, for example, the emulation component will respond with an operational change event, and a status code representing a feature change. This response can trigger the data source to issue further "GET CONFIGURATION" request(s), to discover which feature, if any, has changed.

The data source can also issue a "MODE SENSE(10)" request for Page Code (0x2A), known as the "MM Capabilities and Mechanical Status Page." The emulation component will respond with information that is typical for a simple auto-launch device that includes read-only support for CD-R and CD-RW media. This echoes the information that is returned in response to the "GET CONFIGURATION" request.

At this point, the data source can issue a "TEST UNIT READY" command. This triggers two sequences of request/response events in the emulation component that can support the automatic execution functionality of different operating systems. The commands in the two sequences can be interlaced, and the events will remain pending until the emulation component has passed through all of the expected states. As outlined below, both sequences are typical for an operating system such as Windows XP. The sequences, below, do not account for the number of times that a request, or a sequence of requests, can be repeated. Also, the particular sequence of events can vary depending on the type and version of the operating system executing on the data source. Additional or substitute commands can also be issued.

The first sequence comprises a series of "TEST UNIT READY" commands from the data source to the auto-launch device. The emulation component is configured to fail the first request. The data source then sends a "REQUEST SENSE" command to obtain the extended error information, and the emulation component sets the sense key to "NOT READY," with an additional sense code of "MEDIUM NOT PRESENT." The data source then repeats the "TEST UNIT READY" command, which the emulation component again fails. The data source again sends a "REQUEST SENSE" command and the emulation component responds with a sense key set to "UNIT ATTENTION," and an additional sense code of "MEDIUM MAY HAVE CHANGED." All subsequent "TEST UNIT READY" commands are typically responded to without error.

The second sequence comprises a series of "GET EVENT STATUS NOTIFICATION" requests from the data source to the auto-launch device. Following the first "TEST UNIT READY" command that triggers the first sequence, the data source issues a "GET EVENT STATUS NOTIFICATION" request with the operational change field enabled. The emulation component responds with an operational change event and a status code representing a feature change. On the following "GET EVENT STATUS NOTIFICATION" request the media status field is enabled. The emulation component responds with a media event, a status code representing new media, and a flag set to indicate that the media is present. On all subsequent "GET EVENT STATUS NOTIFICATION" requests where the media status field is enabled, the emulation component responds with a media event and with the media present flag set, but the status code will not indicate new media. In the case where a "GET EVENT STATUS NOTIFICATION" request is issued, and the expected status field is not enabled, the emulation component responds as appropriate for the current state of that event.

At the end of either or both of these sequences, the data source can send a "READ TOC/PMA/ATIP" request to read the Table Of Contents (TOC) from the medium of the auto-launch device. The TOC includes information on the number of tracks on the medium, and the start position of each. The emulation component responds with entries for a default configuration, namely, a single data track that starts immediately after the "lead-in" area. The default TOC declares that the first block of data on the medium starts at address zero. The position of a last track is fixed in the emulation component and represents the space allocated to the data on the auto-launch device, such as the backup application.

When the data source makes a read request of the auto-launch device, the emulation component automatically translates the logical address into a corresponding physical address of the storage device (e.g., first logical storage area 160 (FIG. 1)) that is being represented as the auto-launch device. In addition, where the block sizes of the storage device (e.g., a HDD partition) that is being represented as the auto-launch device (e.g., a CD drive) are different, the emulation component also translates the required amount of auto-launch device data into the appropriate number of blocks on the storage device.

After the method 400 has been completed, the data source recognizes one LUN as an auto-launch device and another LUN as a storage device including a writable data storage medium and is properly configured to communicate independently with each. Thereafter, selectively copying 330 the data files from the data source can commence. As described above, this can include the operating system of the data source automatically launching a backup application from the LUN being represented as the auto-launch device, and writing selected data from the data source to the LUN being represented as the storage device including a writable data storage medium.

Figure 5:
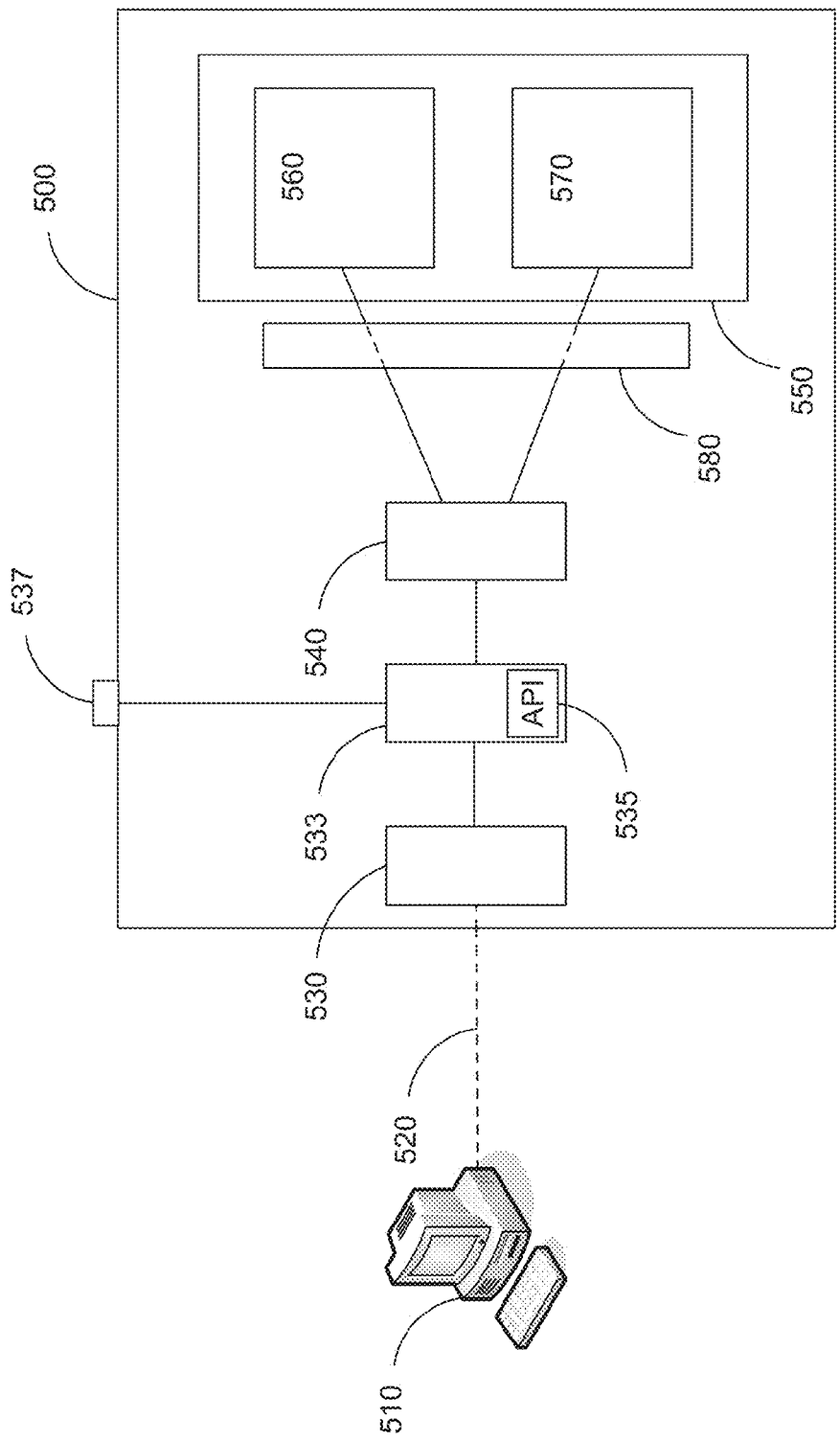
FIG. 5 is a schematic representation of a data backup system according to still another exemplary embodiment of the present invention.

FIG. 5 provides a schematic representation of another exemplary backup system 500 connected to a data source 510 by a connection 520. The backup system 500 comprises a communication interface 530, an emulation component 540, and a storage device 550. The storage device 550 comprises a first logical storage area 560, including a backup application, and second logical storage area 570. As above, the communication interface 530 allows the data source 510 to communicate with the emulation component 540 of the backup system 500 according to a communication protocol. In some embodiments, the backup system 500 further comprises a memory device interface 580 that allows the first and second logical storage areas 560 and 570 to communicate with the emulation component 540.

The backup system 500 also comprises a data protection component 533, including an API 535, in communication between the emulation component 540 and the communication interface 530. The data protection component 533 provides data integrity for software applications, such as the backup application, and data files that have been stored to the storage device 550 by selectively limiting communications between the data source 510 and the storage device 550. Specifically, the data protection component 533 can be set to only pass to the emulation component 540 those I/O commands from the data source 510 that are commands belonging to the command set of the API 535. Thus, for a software application running on the data source 510 to access the storage device 550, the software application must use the commands of the command set of the API 535. A software application that does not use the commands of the API 535 may receive an error message or no response from the data protection component 533.

The data protection component 533 can be implemented through logic such as software, firmware, hardware, or any combination of these. It will be understood that within an embodiment different functions of the data protection component 533 can be implemented with different forms of logic. Thus, white one function of the data protection component 533 is implemented through firmware, for example, another function can be implemented through software. In some embodiments, the data protection component 533 is an IC configured to implement the command set of the API 535. Where the API 535 is implemented through software, the data protection component 533 includes a processor configured to execute the software, such as an Application-Specific Integrated Circuit (ASIC), an Electrically Erasable Programmable Read-Only Memory (EEPROM), or another standard hardware processing element.

The backup application is one example of a software application running on the data source 510 that can access the storage device 550. In order to be able to write data files to the storage device 550, for instance, the backup application is configured to use a write command from the command set of the API 535. In some embodiments the backup application is also configured to use other commands from the command set of the API 535, such as a read command. In some embodiments, the backup application is not configured to read from the storage device 550, and instead another software application such as a restore application can be configured to use the read command from the command set of the API 535. The restore application can be included with the backup application in the storage device 550, or the restore application can be provided separately. For instance, the restore application can be downloaded from a website.

Data integrity on the storage device 550 can also be assured by selecting commands for the command set of the API 535 that are different than comparable commands of commonplace APIs. For example, the commands of the command set of the API 535 can be those of an obscure API, or can be uniquely provided. In this way, only those software applications that are particularly configured to use the commands of the command set of the API 535 are able to access the storage device 550.

In some embodiments, software applications such as the backup application can be limited to include less than the entire command set of the API 535. For example, as noted elsewhere herein, the backup application can be configured to use the write command of the API 535 but not the read command. As another example, the restore application can be configured to use the read command of the API 535 but not the write command.

The data protection component 533, in some embodiments, can be switched between different states. For example, in a protection state the data protection component 533 only recognizes commands belonging to the command set of the API 535, as described above, whereas in an open state the data protection component 533 will pass all commands on to the emulation component 540 without discrimination. In some embodiments, the protection state is the default state of the data protection component 533.

In some instances, the data protection component 533 is set to the protection state at the time of manufacture, but can be switched between states thereafter. The ability to switch states can be implemented through software, hardware, or a combination of software and hardware. In some embodiments, a warning light on the backup system 500 is illuminated while the data protection component 533 is set to the open state.

Switching states through the use of hardware can be achieved, for example, through the use of a mechanical switch 537, such as a toggle switch or a push button, mounted on the housing of the backup system 500. Switching states through the use of software can be achieved, on the other hand, by functionality provided by the data protection component 533. For example, in response to an input from a user, a software application such as the backup application can send a command to the data protection component 533 to switch states.

The availability of the open state can be limited in a variety of ways. As one example, the duration of the open state can be time limited such that at the end of a set period the data protection component 533 automatically reverts to the protection state. In some embodiments, if the backup application is shut down white the data protection component 533 is in the open state, an exit routine of the backup application will send a command to the data protection component 533 to revert to the protection state. The data protection component 533 can also be configured to power-up in the protection state.

The data protection component 533 can likewise be incorporated into the data backup system 200 of FIG. 2 in an analogous fashion. It will also be understood that data backup system 500 can comprise additional logical storage areas that are not protected by the data protection component 533. In this case, the data protection component 533 will require that commands conform to the API 535 only when directed to a protected logical storage area. Additionally, in some embodiments, the states of different logical storage areas cat be changed independently. Thus, the state of one logical storage area can be switched from the protection state to the open state while another logical storage area remains in the protection state.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A data backup system comprising:
a communication interface for communication with a data source;
a first storage device including a first logical storage area including a backup application;
an emulation component wirelessly coupled to and in communication with the first logical storage area, the emulation component comprising logic configured to:
represent the first logical storage area as an auto-launch device;
receive auto-launch device type commands from the data source addressed to the auto-launch device, translate the auto-launch device type commands to first storage device type commands, and send the first storage device type commands to the first logical storage area;
receive first storage device type responses from the first logical storage area, translate the first storage device type responses into auto-launch device type responses, and send the auto-launch device type responses to the data source;
and
a data protection component coupled to and communication between the emulation component and the communication interface, the data protection component including an application programming interface defining a command set, the backup application being configured to use a command of the command set.

2. The data backup system of claim 1 wherein the first storage device further includes a second logical storage area and the emulation component further comprises logic configured to:
represent the second logical storage area as a second storage device including a writable data storage medium;
receive second storage device type commands from the data source addressed to the second logical storage area and send the second storage device type commands to the second logical storage area; and
receive second storage device type responses from the second logical storage area and send the second storage device type responses to the data source.

3. The data backup system of claim 2 wherein the backup application is configured to execute on the data source and to use the command of the command set to write data files from the data source to the second logical storage area.

4. The data backup system of claim 1 wherein the data protection component is switchable between
a protection state wherein the data protection component uses the application programming interface to selectively limit communications with the first storage device, and
an open state wherein the data protection component does not limit communications with the first storage device.

5. The data backup system of claim 4 further comprising a mechanical switch to switch the data protection component between the protection state and the open state.

6. The data backup system of claim 4 wherein the data protection component is configured to receive a command to switch the data protection component between the protection state and the open state.

7. The data backup system of claim 4 wherein the backup application includes an exit routine configured to send a command to the data protection component to revert to the protection state.

8. The data backup system of claim 4 wherein the data protection component is configured to power-up in the protection state.

9. The data backup system of claim 4 wherein the data protection component is configured to revert to the protection state from the open state after being in the open state for a set period of time.

10. The data backup system of claim 1 wherein the data protection component is switchable between
- a first protection state wherein the data protection component uses the application programming interface to selectively limit communications with the first logical storage area, and
- a first open state wherein the data protection component does not limit communications with the first logical storage area.

11. The data backup system of claim 10 wherein the first storage device further includes a second logical storage area and wherein the data protection component is further switchable between
- a second protection state wherein the data protection component uses the application programming interface to selectively limit communications with the second logical storage area, and
- a second open state wherein the data protection component does not limit communications with the second logical storage area.

12. The data backup system of claim 1 wherein the emulation component wirelessly coupled to and in communication with the first logical storage area is via an infrared wireless interface.

13. The data backup system of claim 1 wherein the emulation component wirelessly coupled to and in communication with the first logical storage area is via a WiFi wireless interface.

14. The data backup system of claim 1 wherein the emulation component wirelessly coupled to and in communication with the first logical storage area is via a Bluetooth wireless interface.

15. A data backup system comprising:
- a communication interface for communication with a data source;
- a first storage device including a first logical storage area including a backup application;
- an emulation component coupled to and in communication with the first logical storage area, the emulation component comprising logic configured to:
  - represent the first logical storage area as an auto-launch device;
  - receive auto-launch device type commands from the data source addressed to the auto-launch device, translate the auto-launch device type commands to first storage device type commands, and send the first storage device type commands to the first logical storage area;
  - receive first storage device type responses from the first logical storage area, translate the first storage device type responses into auto-launch device type responses, and send the auto-launch device type responses to the data source;
  and
- a data protection component coupled to and in communication between the emulation component and the communication interface, the data protection component including an application programming interface defining a command set, the backup application being configured to use a command of the command set;
- wherein the first storage device, the emulation component and the data protection component comprise a dock device configuration or a cradle device configuration.

16. A data backup system comprising:
- a communication interface for communication with a data source;
- a first storage device including a first logical storage area including a backup application;
- a second storage device including a second logical storage area;
- an emulation component coupled to and in communication with the first logical storage area and the second logical storage area, the emulation component comprising logic configured to:
  - represent the first logical storage area as an auto-launch device;
  - receive auto-launch device type commands from the data source addressed to the auto-launch device, translate the auto-launch device type commands to first storage device type commands, and send the first storage device type commands to the first logical storage area;
  - receive first storage device type responses from the first logical storage area, translate the first storage device type responses into auto-launch device type responses, and send the auto-launch device type responses to the data source;
  - represent the second logical storage area as a second storage device type including a writable data storage medium;
  - receive second storage device type commands from the data source addressed to the second logical storage area and send the second storage device type commands to the second logical storage area; and
  - receive second storage device type responses from the second logical storage area and send the second storage device type responses to the data source;
  and
- a data protection component coupled to and in communication between the emulation component and the communication interface, the data protection component including an application programming interface defining a command set, the backup application being configured to use a command of the command set.

17. The data backup system of claim 16 wherein the backup application is configured to execute on the data source and to use the command of the command set to write data files from the data source to the second logical storage area.

18. The data backup system of claim 16 wherein the data protection component is switchable between
- a protection state wherein the data protection component uses the application programming interface to selectively limit communications with the second storage device, and
- an open state wherein the data protection component does not limit communications with the second storage device.

19. The data backup system of claim 18 further comprising a mechanical switch to switch the data protection component between the protection state and the open state.

20. The data backup system of claim 18 wherein the data protection component is configured to receive a command to switch the data protection component between the protection state and the open state.

21. The data backup system of claim 18 wherein the backup application includes an exit routine configured to send a command to the data protection component to revert to the protection state.

22. The data backup system of claim 18 wherein the data protection component is configured to power-up in the protection state.

23. The data backup system of claim 18 wherein the data protection component is configured to revert to the protection state from the open state after being in the open state for a set period of time.

24. The data backup system of claim 16 wherein the data protection component is switchable between
- a first protection state wherein the data protection component uses the application programming interface to selectively limit communications with the first logical storage area, and
- a first open state wherein the data protection component does not limit communications with the first logical storage area.

25. The data backup system of claim 24 wherein the data protection component is further switchable between
- a second protection state wherein the data protection component uses the application programming interface to selectively limit communications with the second logical storage area, and
- a second open state wherein the data protection component does not limit communications with the second logical storage area.

26. A data backup system comprising:
- a communication interface for communication with a data source;
- a first storage device including a first logical storage area and a second logical storage area, the first logical storage area including a backup application;
- an emulation component coupled to and in communication with the first logical storage area and the second logical storage area, the emulation component comprising logic configured to:
  - represent the first logical storage area as an auto-launch device;
  - receive auto-launch device type commands from the data source addressed to the auto-launch device, translate the auto-launch device type commands to first storage device type commands, and send the first storage device type commands to the first logical storage area;
  - receive first storage device type responses from the first logical storage area, translate the first storage device type responses into auto-launch device type responses, and send the auto-launch device type responses to the data source;
  - represent the second logical storage area as a second storage device including a writable data storage medium, the second storage device being of a different type of device than the first storage device;
  - receive second storage device type commands from the data source addressed to the second logical storage area and send the second storage device type commands to the second logical storage area and
  - receive second storage device type responses from the second logical storage area and send the second storage device type responses to the data source;
and
- a data protection component coupled to and in communication between the emulation component and the communication interface, the data protection component including an application programming interface defining a command set, the backup application being configured to use a command of the command set.

27. The data backup system of claim 26 wherein the backup application is configured to execute on the data source and to use the command of the command set to write data files from the data source to the second logical storage area.

28. The data backup system of claim 26 wherein the data protection component is switchable between
- a protection state wherein the data protection component uses the application programming interface to selectively limit communications with the second storage device, and
- an open state wherein the data protection component does not limit communications with the second storage device.

29. The data backup system of claim 28 further comprising a mechanical switch to switch the data protection component between the protection state and the open state.

30. The data backup system of claim 28 wherein the data protection component is configured to receive a command to switch the data protection component between the protection state and the open state.

31. The data backup system of claim 28 wherein the backup application includes an exit routine configured to send a command to the data protection component to revert to the protection state.

32. The data backup system of claim 28 wherein the data protection component is configured to power-up in the protection state.

33. The data backup system of claim 28 wherein the data protection component is configured to revert to the protection state from the open state after being in the open state for a set period of time.

34. The data backup system of claim 26 wherein the data protection component is switchable between
- a first protection state wherein the data protection component uses the application programming interface to selectively limit communications with the first logical storage area, and
- a first open state wherein the data protection component does not limit communications with the first logical storage area.

35. The data backup system of claim 34 wherein the data protection component is further switchable between
- a second protection state wherein the data protection component uses the application programming interface to selectively limit communications with the second logical storage area, and
- a second open state wherein the data protection component does not limit communications with the second logical storage area.

* * * * *